US 9,227,637 B2

(12) United States Patent
Nakatsu

(10) Patent No.: US 9,227,637 B2
(45) Date of Patent: Jan. 5, 2016

(54) VEHICLE BRAKING/DRIVING FORCE CONTROL APPARATUS

(71) Applicant: Masatoshi Nakatsu, Susono (JP)

(72) Inventor: Masatoshi Nakatsu, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/514,734

(22) Filed: Oct. 15, 2014

(65) Prior Publication Data
US 2015/0158493 A1 Jun. 11, 2015

(30) Foreign Application Priority Data
Dec. 9, 2013 (JP) ................................. 2013-254016

(51) Int. Cl.
| | |
|---|---|
| *B60W 30/20* | (2006.01) |
| *B60W 10/192* | (2012.01) |
| *B60W 20/00* | (2006.01) |
| *B60W 10/08* | (2006.01) |

(Continued)

(52) U.S. Cl.
CPC .............. *B60W 30/20* (2013.01); *B60W 10/08* (2013.01); *B60W 10/192* (2013.01); *B60W 10/22* (2013.01); *B60W 30/18127* (2013.01); *B60W 20/00* (2013.01); *B60W 2030/206* (2013.01); *B60W 2510/109* (2013.01); *B60W 2520/403* (2013.01); *B60W 2720/403* (2013.01); *B60Y 2300/77* (2013.01)

(58) Field of Classification Search
CPC ..... B60W 10/00; B60W 10/04; B60W 10/08; B60W 10/12; B60W 10/18; B60W 30/00; B60W 30/02

USPC .................. 701/22, 37–40, 69–95
See application file for complete search history.

(56) References Cited

U.S. PATENT DOCUMENTS

| | | | | |
|---|---|---|---|---|
| 5,822,709 | A | * | 10/1998 | Fujita .............................. 701/70 |
| 2003/0192375 | A1 | * | 10/2003 | Sugai et al. ..................... 73/146 |

(Continued)

FOREIGN PATENT DOCUMENTS

| | | |
|---|---|---|
| JP | 2007124735 A | 5/2007 |
| JP | 2007161032 A | 6/2007 |

(Continued)

OTHER PUBLICATIONS

Communication dated Apr. 24, 2015 from the United States Patent and Trademark Office in U.S. Appl. No. 14/514,940.

(Continued)

*Primary Examiner* — Thomas Tarcza
*Assistant Examiner* — Tyler J Lee
(74) *Attorney, Agent, or Firm* — Sughrue Mion, PLLC

(57) ABSTRACT

When a braking/driving force on each wheel is used for vehicle motion control, in order to reduce a noise generated by a zero cross of a motor torque, provided is a distribution setting part, which is to be applied to a vehicle configured so that a conversion rate of converting a braking/driving force on the wheel into a force in a vertical direction of a body by a suspension is different between a front wheel side and a rear wheel side. The distribution setting part sets distributions of a driver-requested driving force to front/rear wheels so as to be larger to the wheels coupled to the suspensions smaller in conversion rate than to the wheels coupled to the suspensions larger in conversion rate. As a result, a zero cross of a motor torque is restrained, resulting in a reduction in generation of a noise caused by a backlash of speed reduction gears.

4 Claims, 8 Drawing Sheets

(51) Int. Cl.
*B60W 30/18* (2012.01)
*B60W 10/22* (2006.01)

(56) References Cited

U.S. PATENT DOCUMENTS

| | | | |
|---|---|---|---|
| 2005/0090943 A1* | 4/2005 | Kogure et al. | 701/1 |
| 2009/0319114 A1* | 12/2009 | Takenaka et al. | 701/29 |
| 2010/0168975 A1* | 7/2010 | Takahara et al. | 701/70 |
| 2011/0015844 A1* | 1/2011 | Perkins et al. | 701/69 |
| 2015/0088379 A1* | 3/2015 | Hirao | 701/37 |

FOREIGN PATENT DOCUMENTS

| | | |
|---|---|---|
| JP | 2008012972 A | 1/2008 |
| JP | 2009-113772 A | 5/2009 |
| JP | 2009-143310 A | 7/2009 |
| JP | 2009247205 A | 10/2009 |
| JP | 2009273274 A | 11/2009 |

OTHER PUBLICATIONS

Communication dated Aug. 28, 2015 from the United States Patent and Trademark Office in U.S. Appl. No. 14/514,940.

* cited by examiner

VEHICLE BRAKING/DRIVING FORCE CONTROL APPARATUS

BACKGROUND OF THE INVENTION

1. Field of the Invention

The present invention relates to a vehicle braking/driving force control apparatus for independently controlling a driving force and a braking force of each of front left and right and rear left and right wheels of a vehicle.

2. Description of the Related Art

Hitherto, there has been known a vehicle braking/driving force control apparatus for independently controlling a driving force and a braking force (both are collectively referred to as braking/driving force) for front left and right and rear left and right wheels of a vehicle. For example, there has been known a vehicle of an in-wheel motor type as a form of an electric vehicle, in which a motor is arranged inside or closely to the wheel of the vehicle, and the wheel is directly driven by the motor. In the vehicle of the in-wheel motor type, each motor is individually controlled for power running or regeneration, and a driving torque or a braking torque applied to each wheel is thus individually controlled, thereby generating a braking/driving force on each wheel.

Each wheel is suspended via a suspension to a vehicle body. In general, as illustrated in FIGS. 2A and 2B, an instantaneous rotation center Cf of a suspension for coupling a front wheel 10f to a vehicle body B is positioned behind and above the front wheel 10f, and an instantaneous rotation center Cr of a suspension for coupling a rear wheel 10r to the vehicle body B is positioned ahead of and above the rear wheel 10r. Therefore, as illustrated in FIG. 2A, when a driving torque is applied to the front wheel 10f, a force Ff1 forward in a travel direction of the vehicle acts at a ground contact point of the front wheel 10f, and a vertical force Fzf1 biasing the vehicle body B downward is generated by the force Ff1 at the ground contact point of the front wheel 10f. Thus, the force in the direction of sinking the vehicle body B acts as a result of the driving of the front wheel 10f. In contrast, as illustrated in FIG. 2B, when a braking torque is applied to the front wheel 10f, a force Ff2 backward in the travel direction of the vehicle acts at the ground contact point of the front wheel 10f, and a vertical force Fzf2 biasing the vehicle body B upward is generated by the force Ff2 at the ground contact point of the front wheel 10f. Thus, the force in the direction of raising the vehicle body B acts as a result of the braking of the front wheel 10f.

On the other hand, the generation direction of the vertical force on the rear wheel 10r is opposite to that for the front wheel 10f. In other words, as illustrated in FIG. 2A, when a driving torque is applied to the rear wheel 10r, a force Fr1 forward in the travel direction of the vehicle acts at a ground contact point of the rear wheel 10r, and a vertical force Fzr1 biasing the vehicle body B upward via the suspension is generated by the force Fr1 at the ground contact point of the rear wheel 10r. Thus, the force in the direction of raising the vehicle body B acts as a result of the driving of the rear wheel 10r. In contrast, as illustrated in FIG. 2B, when a braking torque is applied to the rear wheel 10f, a force Fr2 backward in the travel direction of the vehicle acts at the ground contact point of the rear wheel 10r, and a vertical force Fzr2 biasing the vehicle body B downward via the suspension is generated by the force Fr2 at the ground contact point of the rear wheel 10r. Thus, the force in the direction of sinking the vehicle body B acts as a result of the braking of the rear wheel 10r.

In this way, a part of the longitudinal braking/driving force on the wheel is converted by the suspension into the force in the vertical direction of the body B. Thus, motion control (including a body attitude control such as restraint of a roll motion, a pitch motion, and a heave motion) for the vehicle can be carried out by controlling a braking/driving force on the each wheel. Therefore, a target braking/driving force on the each wheel is calculated as a resultant force of a driver-requested distributed driving force acquired by distributing a driver-requested driving force set in response to an operation amount by a driver to the each wheel and a control braking/driving force for carrying out the motion control for the vehicle.

Based on this view point, for example, a vehicle travel control apparatus proposed in Japanese Patent Application Laid-open No. 2009-143310 controls a braking/driving force of each in-wheel motor to restrain a roll motion of the vehicle.

By the way, when the motion control for the vehicle is carried out by the braking/driving forces on the wheels, the direction of the target braking/driving force may be inverted depending on the motion state of the vehicle. For example, while the control braking/driving force is opposite in direction to the driver-requested distributed driving force, when a relationship in magnitude between both forces changes, the direction of the target braking/driving force is inverted. In this case, the motor is switched from a state (powering) where the driving force is generated on the wheel to a state (regeneration) where the braking force is generated on the wheel, or is switched from the state (regeneration) where the braking force is generated on the wheel to the state (powering) where the driving force is generated on the wheel. Thus, an inversion of the motor torque (so-called zero cross of the motor torque) occurs. Therefore, when the motor torque is transmitted via speed reduction gears to the wheel, a noise is generated when a backlash is taken up by the inversion of the motor torque.

SUMMARY OF THE INVENTION

The present invention has been made in view of the above-mentioned problem, and therefore has an object to restrain a noise from being generated by a backlash.

In order to achieve the above-mentioned object, one feature of one embodiment of the present invention resides in a vehicle braking/driving force control apparatus, including: a motor (30) provided on each of a front left wheel, a front right wheel, a rear left wheel, and a rear right wheel, which is capable of transmitting a torque via gears to each of the wheels, thereby generating a braking/driving force on the each of the wheels; a suspension (20) for coupling the each of the front left wheel, the front right wheel, the rear left wheel, and the rear right wheel to a body, and converting the braking/driving force on the each of the wheels to a force in a vertical direction of the body; target braking/driving force calculation means (50, S11 to S15) for calculating a target braking/driving force for the each of the wheels, the target braking/driving force including: a driver-requested distributed driving force acquired by distributing a driver-requested driving force set based on an operation amount by a driver to the each of wheels; and a control braking/driving force for the each of the wheels required for vehicle motion control; and motor control means (50, S16) for controlling an operation of the motor by following the target braking/driving force, the suspension being configured so that a conversion rate (tan(θf), tan(θr)) for converting the braking/driving force on the each of the wheels into the force in the vertical direction of the body is different between a front wheel side and a rear wheel side, the target braking/driving force calculation means including distribution setting means (50, S13) for setting a distribution of the driver-requested driving force to the front wheels and the rear wheels so that a larger driver-requested driving force is distributed to the wheels coupled to the suspensions on a side smaller in the conversion rate than to the wheels coupled to the suspension on a side larger in the conversion rate.

In the present invention, the front/rear left/right wheels are coupled via the suspensions to the body. The motor is provided for the each wheel. The motor transmits the torque via the gears to the wheel, thereby generating the braking/driving force (force representing a driving force and a braking force) on the wheel. The braking/driving force on the wheel is converted into the force in the vertical direction of the body by the suspension. Vehicle motions can be controlled by controlling the vertical forces. For example, control of restraining a roll motion, a pitch motion, a heave motion, and the like of the vehicle can be carried out.

The target braking/driving force calculation means calculates the target braking/driving force for each of the wheels including the driver-requested distributed driving force acquired by distributing the driver-requested driving force (driving force requested by a driver) set based on the operation amount (operation amount to control the vehicle to travel) by the driver to each of the wheels, and the control braking/driving force for each of the wheels required for the vehicle motion control. The motor control means controls the operations of the motors by following the target braking/driving forces.

The suspensions are configured so that the conversion rate of converting the braking/driving force into the force in the vertical direction of the body is different between the front wheel side and the rear wheel side. For example, the conversion rate is a value corresponding to a magnitude of an angle between a line connecting between a ground contact point of the wheel and an instantaneous rotational center of the suspension for coupling the wheel to the body and a ground horizontal surface in a side view of the vehicle. Thus, the angle between the line connecting between the ground contact point of the front wheel and the instantaneous rotation center of the suspension and the ground horizontal surface and the angle between the line connecting between the ground contact point of the rear wheel and the instantaneous rotation center of the suspension and the ground horizontal surface are not the same.

Therefore, when the motion control for the vehicle is carried out by the braking/driving forces on the wheels, the wheel coupled to the suspension on the side smaller in conversion rate of converting the braking/driving force into the vertical force on the body needs to change the braking/driving force more than the wheel coupled to the suspension on the side larger in conversion rate. As a result, the torque of the motor for driving the wheel coupled to the suspension on the side smaller in conversion rate tends to be inverted. In other words, the zero cross of the motor torque tends to occur on the motor for the wheel coupled to the suspension on the side smaller in conversion rate. When the zero cross of the motor torque occurs, a noise is generated when a backlash of gears is taken up.

Thus, in the present invention, the distribution setting means sets the distributions of the driver-requested driving force to the front/rear wheels so that the distributions are larger for the wheels coupled to the suspensions on the side smaller in conversion rate than for the wheels coupled to the suspensions on the side larger in conversion rate. With this, the distribution of the driver-requested driving force to the wheels on the side smaller in conversion rate can be increased, thereby restraining a frequency of the zero cross of the motor torque on the wheels on the side smaller in conversion rate. As a result, while the driver-requested driving force is satisfied, the frequency of the zero cross of the motor torque can be restrained for the four wheels as a whole. Thus, the noise is restrained from being generated by the backlash.

One aspect of the present invention resides in that the distribution setting means sets, regarding the distribution of the driver-requested driving force to the front wheels and the rear wheels, a ratio of distribution to the wheels coupled to the suspensions on the side smaller in the conversion rate to a constant set distribution ratio (tan $\theta r$/(tan $\theta f$+tan $\theta r$)) more than 0.5 when the driver-requested driving force is less than a set driving force, and changes (Fmax/Fd) the ratio of distribution so that the ratio of distribution decreases within a range of the set distribution ratio or less as the driver-requested driving force increases when the driver-requested driving force is equal to or more than the set driving force.

In the present invention, when the driver-requested driving force is less than the set driving force, the distribution setting means sets the ratio of distribution to the wheels coupled to the suspension on the side smaller in conversion rate to the constant set distribution ratio larger than 0.5. As a result, the frequency of the zero cross of the motor torque on the wheels on the side smaller in conversion rate can be restrained. When the driver-requested driving force is large, and the set distribution ratio is maintained, after the driver-requested distributed driving force reaches a driving limit of the motor for the wheel coupled to the suspension on the side smaller in conversion rate, the driver-requested driving force is no longer distributed to the front/rear wheels. Thus, when the driver-requested driving force is equal to or more than the set driving force, the distribution setting means changes the distribution ratio for the wheels coupled to the suspensions on the side smaller in conversion rate so that the distribution ratio decreases within the range of the set distribution ratio or less as the driver-requested driving force increases. As a result, while the frequency of the zero cross of the motor torque on the wheels on the side smaller in conversion rate is restrained, the driver-requested driving force can be appropriately distributed to the front/rear wheels.

One aspect of the present invention resides in that the distribution setting means uses, as the set distribution ratio, a value calculated when a sum (tan $\theta f$+tan $\theta r$) of the conversion rate of the suspensions for the front wheels and the conversion rate of the suspensions for the rear wheels is set as a denominator and the conversion rate (+tan $\theta r$) of the suspensions on the side larger in the conversion rate is set as a numerator.

In the present invention, the set distribution ratio is set to the value calculated when the sum of the conversion rate of the suspensions for the front wheels and the conversion rate of the suspensions for the rear wheels is set as the denominator and the conversion rate of the suspensions on the side larger in the conversion rate is set as the numerator. Thus, due to a reason described later, a margin to a zero cross of the torque of the motor for the front wheel and a margin to a zero cross of the torque of the motor for the rear wheel can be equal to each other. As a result, the driver-requested driving force is appropriately distributed to the front/rear wheels, and the frequency of the zero cross of the motor torque can thus be more appropriately restrained for the four wheels as a whole.

One aspect of the present invention resides in that a vehicle braking/driving force control device further includes vehicle speed acquisition means (S131) for acquiring a vehicle speed, and the distribution setting means sets (S133), regarding the distribution of the driver-requested driving force to the front wheels and the rear wheels, a ratio of distribution to the wheels coupled to the suspensions on the side smaller in the conversion rate to a value larger than 0.5 when the vehicle speed is less than a first set vehicle speed (V1) and sets (S134)

the ratio of distribution to a value equal to or less than 0.5 when the vehicle speed is equal to or more than a second set vehicle speed (V2), which is equal to or more than the first set vehicle speed.

In general, background noises (such as an engine sound, a wind noise, and a tire noise) are low during a travel at a low vehicle speed, and the driver thus tends to hear the noise caused by the backlash of the speed reduction gears, and a road surface input is often a large input at a low frequency. An amplitude of the control braking/driving force for the road surface input thus increases, and the zero cross of the motor torque tends to occur. Moreover, the driver-requested driving force is small and the motor torque itself is small, and the margin to the zero cross is thus small. On the other hand, the background noise is high during a travel at a high vehicle speed, and the noise caused by the backlash of the speed reduction gears is thus hard for the driver to hear. Moreover, the road surface input is often a small input at a high frequency, and the amplitude of the control braking/driving force for the road surface input thus decreases. Moreover, a torque matching a large travel resistance is acting as the driver-requested driving force, and the motor torque itself is thus large, and the margin to the zero cross is large. However, conversely, a margin in the driving direction of the motor torque decreases, and the motor torque tends to first reach the driving limit on the wheel on the side smaller in conversion rate during the vehicle motion control.

Thus, in the present invention, when the vehicle speed is less than the first set vehicle speed, the distribution setting means sets the ratio of distribution to the wheels coupled to the suspensions on the side smaller in conversion rate to a value larger than 0.5 when the vehicle speed is less than the first set vehicle speed. Thus, the zero cross of the motor torque, which tends to occur during the travel at a low vehicle speed, is restrained, resulting in a reduction in the noise caused by the backlash.

On the other hand, the motor toques on the wheels on the side smaller in conversion rate tend to reach the driving limit earlier than the motor torques on the wheels on the side larger in conversion rate during the travel at a high vehicle speed, but in the present invention, the distribution setting means sets the distribution ratio to the wheels coupled to the suspensions on the side smaller in conversion rate to a value equal to or less than 0.5 when the vehicle speed is equal to or more than the second set vehicle speed, which is equal to or more than the first set vehicle speed. Therefore, such a defect that the motor torques on the wheels on the side smaller in conversion rate first reach the driving limit can be reduced, resulting in an extended vehicle motion control range.

In the description above, reference symbols used in the embodiments are enclosed in parentheses and assigned to each configuration of the invention corresponding to the embodiments in order to facilitate the understanding of the invention, but each configuration requirement of the invention is not limited to the embodiments prescribed by the reference symbols.

DETAILED DESCRIPTION OF THE PREFERRED EMBODIMENTS

Figure 1:
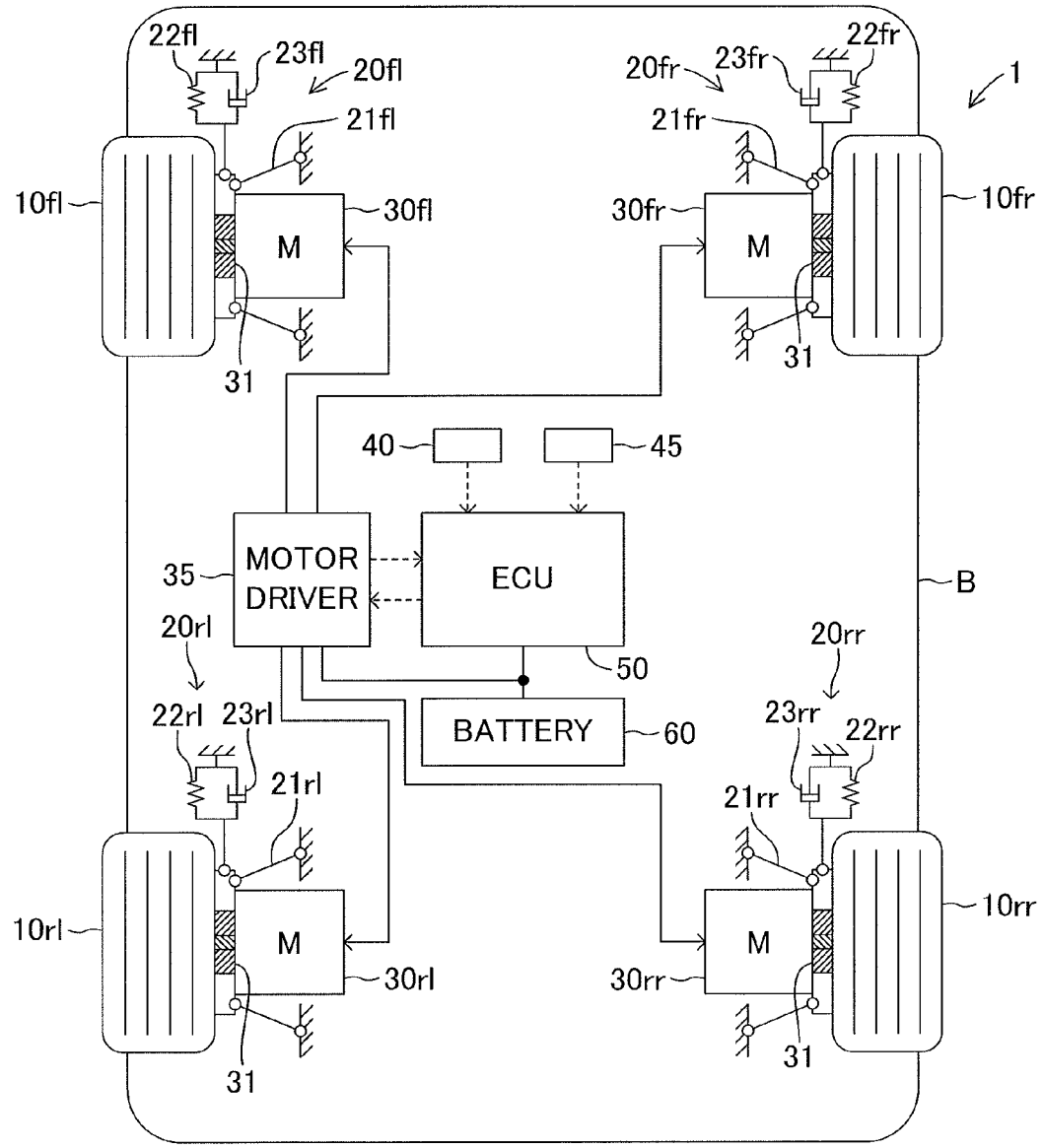
FIG. 1 is a schematic configuration diagram of a vehicle on which a vehicle braking/driving force control apparatus according to an embodiment of the present invention is installed.

A detailed description is now given of embodiments of the present invention referring to the drawings. FIG. 1 schematically illustrates a configuration of a vehicle 1 on which a vehicle braking/driving force control apparatus according to this embodiment is mounted.

The vehicle 1 includes a front left wheel 10$fl$, a front right wheel 10$fr$, a rear left wheel 10$rl$, and a rear right wheel 10$rr$. The front left wheel 10$fl$, the front right wheel 10$fr$, the rear left wheel 10$rl$, and the rear right wheel 10$rr$ are suspended via independent suspensions 20$fl$, 20$fr$, 20$rl$, and 20$rr$ to a vehicle body B, respectively.

The suspensions 20$fl$, 20$fr$, 20$rl$, and 20$rr$ are coupling structures for coupling the vehicle body B and the wheels 10$fl$, 10$fr$, 10$rl$, and 10$rr$ to each other, respectively, and include link mechanisms 21$fl$, 21$fr$, 21$rl$, and 21$rr$ constructed by suspension arms and the like, suspension springs 22$fl$, 22$fr$, 22$rl$, and 22$rr$ for supporting loads in the vertical direction and absorbing impact, and shock absorbers 23$fl$, 23$fr$, 23$rl$, and 23$rr$ for attenuating a vibration of a sprung mass (vehicle body B). A publicly known four-wheel independent suspension such as a wishbone type suspension and a strut type suspension can be employed as the suspensions 20$fl$, 20$fr$, 20$rl$, and 20$rr$.

Motors 30$fl$, 30$fr$, 30$rl$, and 30$rr$ are built into the inside of the front left wheel 10$fl$, the front right wheel 10$fr$, the rear left wheel 10$rl$, and the rear right wheel 10$rr$, respectively. The motors 30$fl$, 30$fr$, 30$rl$, and 30$rr$, which are so-called in-wheel motors, are respectively arranged at unsprung locations of the vehicle 1 along with the front left wheel 10$fl$, the front right wheel 10$fr$, the rear left wheel 10$rl$, and the rear right wheel 10$rr$, and are coupled to the front left wheel 10$fl$, the front right wheel 10$fr$, the rear left wheel 10$rl$, and the rear right wheel 10$rr$ so that motor torques can be transmitted to the respective wheels via speed reduction gears 31. In the vehicle 1, rotations of the respective motors 30$fl$, 30$fr$, 30$rl$, and 30$rr$ can be independently controlled to independently control the driving forces and the braking forces to be generated on the front left wheel 10$fl$, the front right wheel 10$fr$, the rear left wheel 10$rl$, and the rear right wheel 10$rr$.

In the following, the respective wheels 10$fl$, 10$fr$, 10$rl$, and 10$rr$, the suspensions 20$fl$, 20$fr$, 20$rl$, and 20$rr$, the link mechanisms 21*fl*, 21*fr*, 21*rl*, and 21*rr*, the suspension springs 22*fl*, 22*fr*, 22*rl*, and 22*rr*, the shock absorbers 23*fl*, 23*fr*, 23*rl*, and 23*rr*, and the motors 30*fl*, 30*fr*, 30*rl*, and 30*rr* are generally referred to as wheel 10, suspension 20, link mechanism 21, suspension spring 22, shock absorber 23, and motor 30 unless a specific one needs to be identified. Moreover, if the front wheels 10*fl* and 10*fr* and the rear wheels 10*rl* and 10*rr* need to be distinguished from each other and identified among the wheels 10*fl*, 10*fr*, 10*rl*, and 10*rr*, the front wheels 10*fl* and 10*fr* are referred to as front wheel 10*f*, and the rear wheels 10*rl* and 10*rr* are referred to as rear wheel 10*r*. Similarly, for the suspension 20, the link mechanism 21, the suspension spring 22, the shock absorber 23, and the motor 30, if ones on the front wheel side are identified, they are referred to as front wheel suspension 20*f*, front wheel link mechanism 21*f*, front wheel suspension spring 22*f*, front wheel shock absorber 23*f*, and front wheel motor 30*f*, and if ones on the rear wheel side are identified, they are referred to as rear wheel suspension 20*r*, rear wheel link mechanism 21*r*, rear wheel suspension spring 22*r*, rear wheel shock absorber 23*r*, and rear wheel motor 30*r*.

For example, brushless motors are used as the respective motors 30. The respective motors 30 are connected to a motor driver 35. The motor driver 35 includes, for example, inverters, and four sets of inverters are provided for the respective motors 30. The motor driver 35 converts DC power supplied from a battery 60 into AC power, and independently supplies the AC power to the respective motors 30. As a result, the driving of the respective motors 30 is controlled to generate torques to apply the driving forces to the respective wheels 10. Such a state that the electric power is supplied to the motor 30 to generate the driving torque is referred to as power running.

Moreover, each motor 30 also functions as an electric power generator, for generating electric power from rotational energy of each wheel 10, and recharging the battery 60 with the generated electric power via the motor driver 35. The braking torque generated by the electric power generation of the motor 30 applies the braking force to the wheel 10. A brake apparatus is provided for each wheel 10, but does not directly relate to the present invention, and a description and illustration thereof are therefore omitted.

The motor driver 35 is connected to an electronic control unit 50 for motor control. The electronic control unit 50 for motor control (hereinafter referred to as motor ECU 50) includes a microcomputer constructed by a CPU, a ROM, and a RAM as a main component, and executes various programs to independently control the operations of the individual motors 30. The motor ECU 50 is connected to an operation state detection device 40 for detecting an operation state of operations performed by the driver to control the vehicle to travel and a motion state detection device 45 for detecting a motion state of the vehicle, and inputs detection signals output from the detection devices 40 and 45.

The operation state detection device 40 is constructed by an accelerator sensor for detecting an accelerator operation amount by the driver based on a depressing amount (or an angle or a pressure) of an accelerator pedal, a brake sensor for detecting a brake operation amount by the driver based on a depressing amount (or an angle or a pressure) of a brake pedal, a steering angle sensor for detecting a steering operation amount of an operation on a steering wheel by the driver, and the like. The motion state detection device 45 is constructed by an appropriate combination of a vehicle speed sensor for detecting a travel speed of the vehicle body B, a yaw rate sensor for detecting a yaw rate of the vehicle body B, a sprung mass acceleration sensor for detecting an acceleration in the vertical direction of the vehicle body B (sprung mass) at each wheel position, a lateral acceleration sensor for detecting a lateral acceleration in the lateral direction of the vehicle body B, a pitch rate sensor for detecting a pitch rate of the vehicle body B, a roll rate sensor for detecting a roll rate of the vehicle body B, a stroke sensor for detecting a stroke amount of each suspension 20, an unsprung mass acceleration sensor for detecting a vertical acceleration in the vertical direction of an unsprung mass of the each wheel 10, and the like. A direction of a sensor value including a direction element is identified depending on the sign thereof.

Figure 2A:
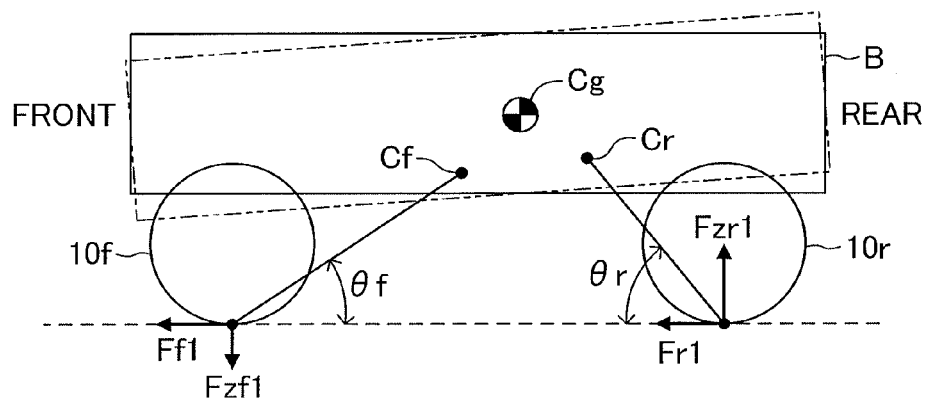
FIGS. 2A and 2B are diagrams illustrating a relationship between a braking/driving force and a vertical force.
Figure 2B:
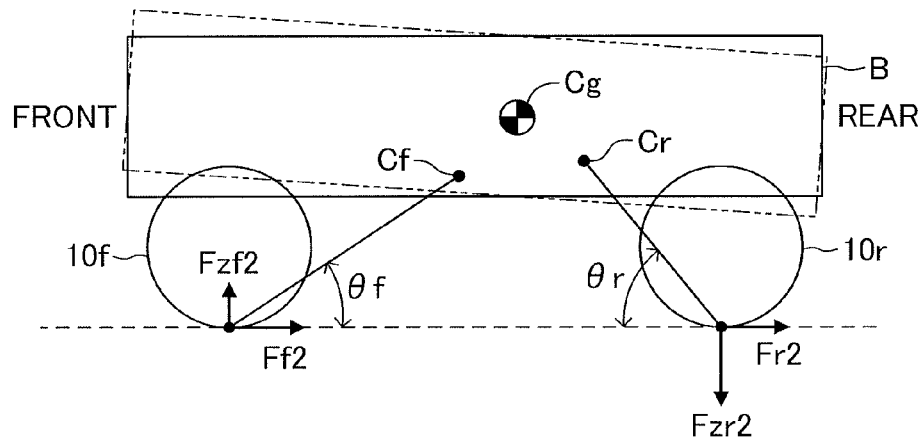

As illustrated in FIGS. 2A and 2B, the suspension 20 for suspending each wheel 10 is configured so that, in side view of the vehicle, an instantaneous rotation center Cf (an instantaneous center of the front wheel 10*f* with respect to the vehicle body B) of the front wheel suspension 20*f* is positioned behind and above the front wheel 10*f*, and an instantaneous rotation center Cr (an instantaneous center of the rear wheel 10*r* with respect to the vehicle body B) of the rear wheel suspension 20*r* is positioned ahead of and above the rear wheel 10*r*. Moreover, when an angle (smaller angle) formed by a ground horizontal surface and a line connecting between a ground contact point of the front wheel 10*f* and the instantaneous rotation center Cf is denoted by $\theta f$, and an angle (smaller angle) formed by the ground horizontal surface and a line connecting between a ground contact point of the rear wheel 10*r* and the instantaneous rotation center Cr is denoted by $\theta r$, such a relationship that $\theta r$ is larger than $\theta f$ is satisfied ($\theta f < \theta r$). In the following, $\theta f$ is referred to as instantaneous rotation angle $\theta f$, and $\theta r$ is referred to as instantaneous rotation angle $\theta r$.

In this configuration (geometry) of the suspension 20, when a driving torque is applied to the front wheel 10*f*, as illustrated in FIG. 2A, a force Ff1 forward in a travel direction of the vehicle acts at the ground contact point of the front wheel 10*f*, and a vertical force Fzf1 biasing the vehicle body B downward is generated by the force Ff1 at the ground contact point of the front wheel 10*f*. Thus, the force in the direction of sinking the vehicle body B acts as a result of the driving of the front wheel 10*f*. In contrast, as illustrated in FIG. 2B, when a braking torque is applied to the front wheel 10*f*, a force Ff2 backward in the travel direction of the vehicle acts at the ground contact point of the front wheel 10*f*, and a vertical force Fzf2 biasing the vehicle body B upward is generated by the force Ff2 at the ground contact point of the front wheel 10*f*. Thus, the force in the direction of raising the vehicle body B acts as a result of the braking of the front wheel 10*f*. Moreover, as illustrated in FIG. 2A, when a driving torque is applied to the rear wheel 10*r*, a force Fr1 forward in the travel direction of the vehicle acts at a ground contact point of the rear wheel 10*r*, and a vertical force Fzr1 biasing the vehicle body B upward is generated by the force Fr1 at the ground contact point of the rear wheel 10*r*. Thus, the force in the direction of raising the vehicle body B acts as a result of the driving of the rear wheel 10*r*. In contrast, as illustrated in FIG. 2B, when a braking torque is applied to the rear wheel 10*r*, a force Fr2 backward in the travel direction of the vehicle acts at the ground contact point of the rear wheel 10*r*, and a vertical force Fzr2 biasing the vehicle body B downward is generated by the force Fr2 at the ground contact point of the rear wheel 10*r*. Thus, the force in the direction of sinking the vehicle body B acts as a result of the braking of the rear wheel 10*r*. The suspension 20 converts the driving force and the braking force on the wheel 10 into the force in the vertical direction of the vehicle body B in this way.

Thus, the force in the vertical direction can be applied to the vehicle body B by controlling the driving force or the braking force (braking/driving force) on the wheel 10, resulting in control of the motion state of the vehicle. In the following, when a magnitude of the braking/driving force is discussed, an absolute value of the magnitude is used.

The motor ECU 50 calculates a driver-requested driving force Freq based on the accelerator operation amount detected by the operation state detection device 40, and calculates a control braking/driving force Fcx independently for each of the wheels 10 based on the vehicle motion state detected by the motion state detection device 45. Then, as described later, the motor ECU 50 distributes the driver-requested driving force Freq to the four wheels to calculate a driver-requested distributed driving force Fdx on the each wheel 10. Further, the motor ECU 50 sets a sum of the driver-requested distributed driving force Fdx and the control braking/driving force Fcx as a target braking/driving force Fx for each of the wheel 10. The motor ECU 50 controls the motor driver 35 to generate an output torque corresponding to the target braking/driving force Fx on the each motor 30. It should be noted that the control braking/driving force Fcx, the driver-requested distributed driving force Fdx, and the target braking/driving force Fx respectively generally refer to the control braking/driving forces, the driver-requested distributed driving forces, and the target braking/driving forces on the respective wheels 10.

A magnitude of the vertical force acting on the vehicle body B is a value acquired by multiplying the braking/driving force Ff (Ff1 or Ff2) by tan(θf) for the front wheel 10f side, and is a value acquired by multiplying the braking/driving force Fr (Fr1 or Fr2) by tan(θr) for the rear wheel 10r side. Those terms of tan(θf) and tan(er) each represent a conversion rate for converting the braking/driving force into the vertical force on the vehicle body B (hereinafter referred to as "vertical force conversion rate"). The function of converting the braking/driving force into the vertical force on the body B is provided mainly by the link mechanism 21. However, the final vertical force conversion rate is determined by the positions of the instantaneous rotation centers Cf and Cr, and the instantaneous rotation centers Cf and Cr also relate to the suspension springs 22 and the shock absorbers 23, and the entire suspension 20 can thus be considered as a member for converting the braking/driving force into the vertical force on the body B.

In the vehicle according to this embodiment, the suspension 20f for the front wheel 10f is less in vertical force conversion rate than the suspension 20r for the rear wheel 10r. Therefore, when vertical forces at the same level are generated on the front/rear wheels 10f and 10r for the motion control for the vehicle, the braking/driving force of the front wheel 10f is more in change amount than the rear wheel 10r.

For example, such a case that the motor 30 is driven to generate the yaw motion of the vehicle is considered. When the yaw motion is generated, the control braking/driving force Fcx in the forward direction is applied to a turning outer wheel, and the control braking/driving force Fcx which is the same in magnitude and is opposite in direction with respect to the control braking/driving force Fcx applied on the turning outer wheel is applied to a turning inner wheel. Therefore, a roll moment (hereinafter referred to as front-wheel-side roll moment) generated by the driving forces Ff1 on the front wheels 10f and a roll moment (hereinafter referred to as rear-wheel-side roll moment) generated by the driving forces Fr1 on the rear wheels 10r act on the body B. The front-wheel-side roll moment and the rear-wheel-side roll moment are opposite to each other in direction. In this case, the vertical force conversion rate on the rear wheels 10r is larger than the vertical force conversion rate on the front wheels 10f, and the rear-wheel-side roll moment is more than the front-wheel-side roll moment. Thus, in order to balance the front-wheel-side roll moment and hence the rear-wheel-side roll moment with each other, the control braking/driving force Fcx on the front wheel 10f needs to be larger than that on the rear wheel 10r. In order to satisfy this necessity, when a yaw motion in the lateral direction is generated on the vehicle while the roll control is being carried out, the front wheels 10f are larger in the control braking/driving force Fcx than the rear wheels 10r.

Figure 5:
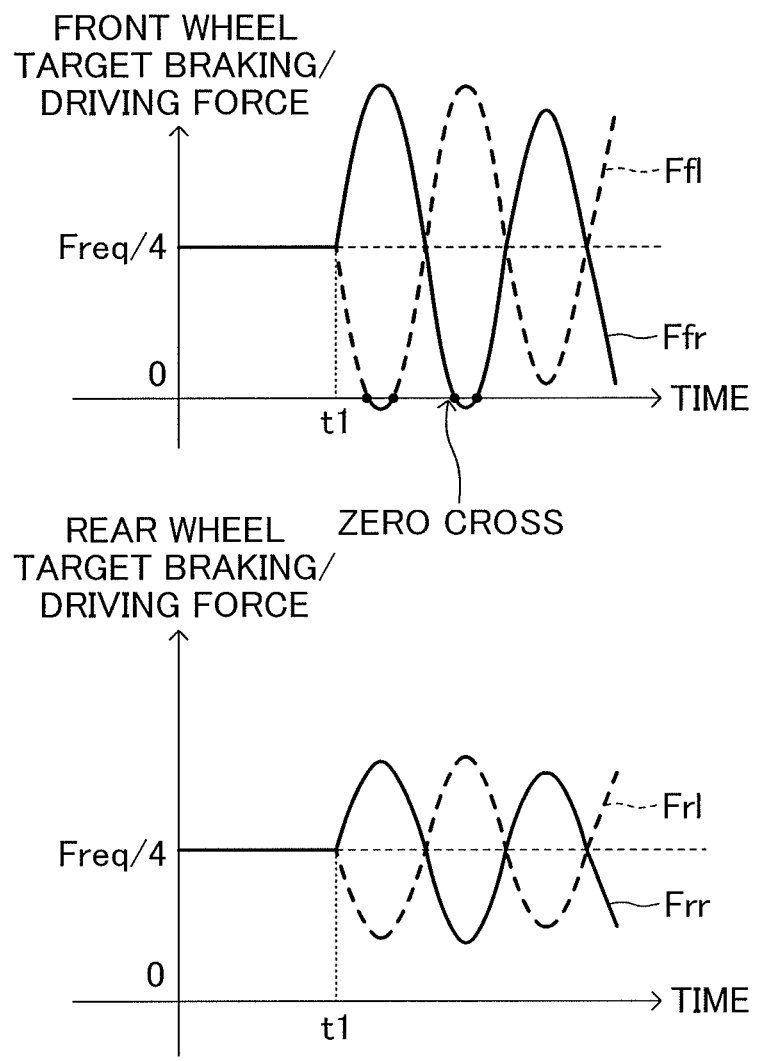
FIG. 5 is a graph showing target braking/driving forces during the roll control according to a related-art example.

FIG. 5 shows transitions of target braking/driving forces Ffl and Ffr on the front wheels 10fl and 10fr and target braking/driving forces Frl and Frr on the rear wheels 10rl and 10rr when the vehicle is controlled to generate the lateral yaw motion while the roll control is being carried out. This graph shows such an example that the driver-requested driving force Freq is equally distributed to the front/rear wheels 10f and 10r (in other words, equally distributed to the four wheels) as in the related-art apparatus. When a request for the yaw motion occurs at a time point t1, the control braking/driving force Fcx for the yaw motion is added to the driver-requested distributed driving force Freq/4 distributed to the four wheels. In this case, the control braking/driving force Fcx on the front wheel 10f is set to a larger value than that on the rear wheel 10r in order to balance the front-wheel-side roll moment and the rear-wheel-side roll moment with each other, in other words, in order to generate the vertical forces in the same magnitude on the front wheel 10f side and the rear wheel 10r side. Then, each time the direction of the yaw motion changes, the direction of the control braking/driving force Fcx changes. Thus, as shown in FIG. 5, the front wheel 10f is more in a variation width of the control braking/driving force Fcx than the rear wheel 10r. As a result, signs (positive or negative) of the target braking/driving forces Ffl and Ffr on the front wheels 10fl and 10fr are more likely to be inverted. On the other hand, signs (positive or negative) of the target braking/driving forces Frl and Frr on the rear wheels 10rl and 10rr are less likely to be inverted. Thus, an operation of the motor 30f on the front wheel 10f switches from the powering to the regeneration or from the regeneration to the powering during the roll motion control. In other words, the zero cross of the motor torque occurs on the front wheels 10f. Therefore, the noise when a backlash of the speed reduction gears 31 is taken up is generated at each zero cross of the motor torque.

Thus, in this embodiment, the distribution of the driver-requested driving force Freq to the wheels 10 on the side smaller in vertical force conversion rate is increased to increase a margin to the inversion of the sign of the target braking/driving forces Fx, in other words to increase a margin to the zero cross of the motor torque, thereby restraining the noise from being generated due to the backlash.

Figure 3:
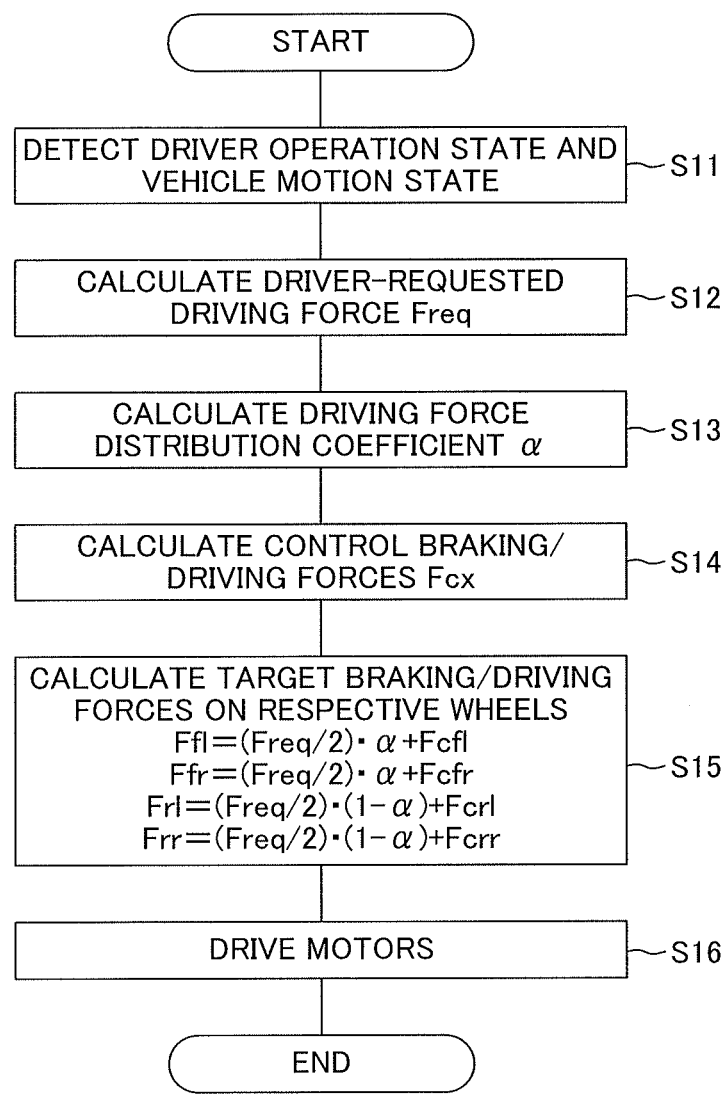
FIG. 3 is a flow chart illustrating a motor control routine according to a first embodiment of the present invention.

FIG. 3 illustrates a motor control routine for solving the problem. The motor ECU 50 repeats the motor control routine at a predetermined short cycle. When this routine starts, in Step S11, the motor ECU 50 first detects the driver operation state and the vehicle motion state. In this case, the motor ECU 50 acquires the accelerator operation amount, the brake operation amount, and the steering operation amount acquired from the sensor values of the operation state detection device 40, and acquires motion state amounts representing degrees of the vehicle speed and motion states (the yaw motion, the roll motion, the pitch motion, and the heave motion) of the vehicle body acquired from the sensor values detected by the motion state detection device 45.

Then, in Step S12, the motor ECU 50 calculates the driver-requested driving force Freq based on the accelerator operation amount. The driver-requested driving force Freq is a driving force in a vehicle fore-and-aft direction requested by the driver to be generated on the entire vehicle, namely, a driving force for traveling (force having such a direction as to increase the rpm of the wheels). The motor ECU 50 stores association data such as a map for deriving the driver-requested driving force Freq from the accelerator operation amount, and uses the association data to calculate the driver-requested driving force Freq. For example, the driver-requested driving force Freq is set to such a value as to increase as an accelerator operation amount (such as an accelerator opening degree) increases. In this case, the vehicle speed may be considered so that the driver-requested driving force Freq is corrected to decrease as the vehicle speed increases.

Then, in Step S13, the motor ECU 50 calculates a driving force distribution coefficient α for the front/rear wheels 10f and 10r. On this occasion, the driving force distribution coefficient α represents a ratio of the driver-requested driving force Freq distributed to the front wheels 10f. Thus, the ratio of a distribution to the rear wheels 10r is represented as (1−α). The driving force distribution coefficient α calculated in Step S13 is set so that the distribution of the driver-requested driving force Freq to the front wheels 10f is larger than to the rear wheels 10r. In other words, the driving force distribution coefficient α is set to a value of more than 0.5 and equal to or less than 1.

A description is now given of the calculation of the driving force distribution coefficient α between the front wheels 10f and the rear wheels 10r. In this embodiment, the distribution ratio of the driver-requested driving force Freq to the front/rear wheels 10f and 10r is set so that the margin to the zero cross of the motor torque is equal for the front and rear wheels 10f and 10r. In other words, the distribution of the driver-requested driving force Freq to the front wheels 10f on the side smaller in vertical force conversion rate is increased so that the margin to the zero cross of the motor torque is equal for the front/rear wheels 10f and 10r. A description is now given of a specific idea for this distribution.

1. Vertical Force

When the driving force on the front wheel 10f is denoted by Ff, and the driving force on the rear wheel 10r is denoted by Fr, the vertical force Fzf generated by the driving force Ff on the front wheel 10f and the vertical force Fzr generated by the driving force Fr on the rear wheel 10r are represented by the following equations.

$$Fzf=Ff \times \tan \theta f=Ff \cdot \Theta f \text{ (defined as } \Theta f=\tan \theta f\text{)}$$

$$Fzr=Fr \times \tan \theta r=Fr \cdot \Theta r \text{ (defined as } \Theta r=\tan \theta r\text{)}$$

2. Driving Forces on Front and Rear Wheels after Distribution

When the driver-requested driving force Freq is represented as Fd, and the driving force distribution coefficient α when the driving force distribution ratio for the front wheel 10f is represented as α(0≤α≤1), the driving force distribution ratio for the rear wheel 10r is represented as (1−α). The driving force Ff for the front wheel 10f and the driving force Fr for the rear wheel 10r can be represented by using the driving force distribution coefficient α by the following equations.

$$Ff=\alpha \times Fd=\alpha \cdot Fd$$

$$Fr=(1-\alpha) \times Fd=(1-\alpha) \cdot Fd$$

When a is 0, 100% of the driver-requested driving force Freq is distributed to the rear wheel 10r, and when α is 1, 100% of the driver-requested driving force Freq is distributed to the front wheel 10f.

3. Vertical Force after Distribution

The vertical force Fzf generated by the driving force Ff on the front wheel 10f and the vertical force Fzr generated by the driving force Fr on the rear wheel 10r after the distribution of the driver-requested driving force Freq to the front and rear wheels 10f and 10r can be represented by the following equations.

$$Fzf=Ff \times \Theta f=\alpha \cdot Fd \cdot \Theta f$$

$$Fzr=Fr \times \Theta r=(1-\alpha) \cdot Fd \cdot \Theta r$$

4. Driving Force Distribution Ratio α to Equalize Zero Cross Margin on Front/Rear Wheels When the driver-requested driving force Freq is distributed to the front/rear wheels 10f and 10r, and the driving force distribution ratio is determined so that the vertical forces in the same magnitude are generated on the front/rear wheels 10f and 10r, it is considered that the margins to the zero cross of the motor torque can be made the same on the front/rear wheels 10f and 10r. Thus, α is acquired so that the following relationship is satisfied.

$$Fzf=Fzr$$

As described above, the relationships of Fzf=Ff×Θf and Fzr=Fr×Θr hold, and the relationship of Fzf=Fzr is thus rewritten to the following equation.

$$Ff \cdot \Theta f=Fr \cdot \Theta r$$

Thus, a relationship represented by the following equation is acquired.

$$Ft:Fr=\Theta r:\Theta f$$

This relational equation is represented by using the driving force distribution coefficient α as the following equation.

$$\alpha:(1-\alpha)=\Theta r:\Theta f$$

Thus, the driving force distribution coefficient α can be represented as the following equation.

$$\alpha=\Theta r/(\Theta f+\Theta r)=\tan \theta r/(\tan \theta f+\tan \theta r)$$

θr and θf are the constant values, and the driving force distribution coefficient α is thus also a constant value.

5. Driving Force Distribution Ratio α after Front/Rear Driving Forces Saturate

When the driving force distribution coefficient α is set as described above, the driving force on the front wheel 10f which is the wheel on the side smaller in vertical force conversion rate saturates earlier than the driving force on the rear wheel 10r. In other words, the driving force reaches the driving limit of the motor 30. On this occasion, when the maximum driving force, which is the maximum value of a total of the driving forces on the left and right two wheels, is represented as Fmax, the driving force Ff on the front wheels 10f is represented as Ff=α·Fd before the saturation. Moreover, when the driving force Ff on the front wheels 10f saturates (Ff=Fmax), Fd is represented as the following equation by using the relationship of Fmax=Fd·α.

$$Fd=F\text{max}/\alpha$$

Figure 6:
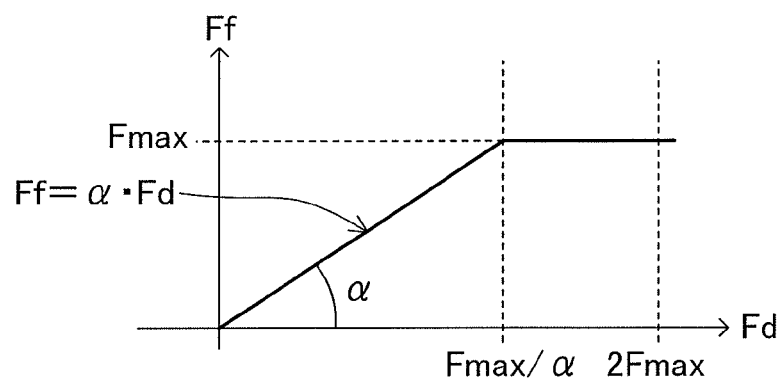
FIG. 6 is a graph showing a characteristic of a driving force on a front wheel.

Thus, as shown in FIG. 6, the driving force Ff on the front wheels 10f takes a value of α·Fd in the range in which Fd is less than Fmax/α, and is maintained to a value of the constant maximum driving force Fmax when Fd is equal to or more than Fmax/α.

Figure 7:
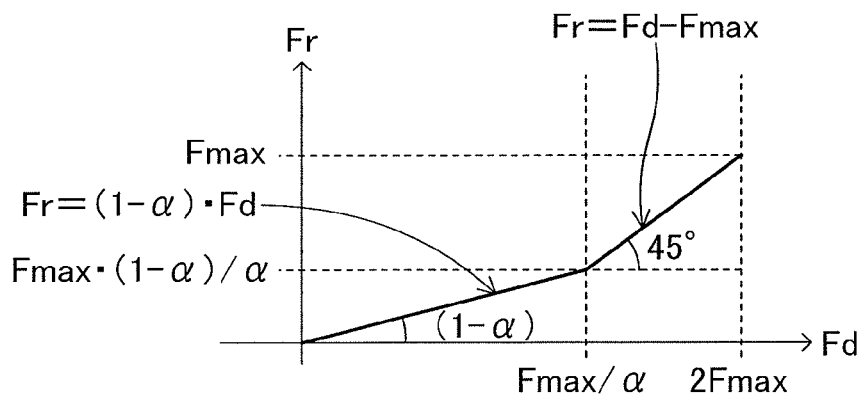
FIG. 7 is a graph showing a characteristic of a driving force on a rear wheel.

On the other hand, as shown in FIG. 7, the driving force Fr on the rear wheels 10r is set to a value depending on Fd. In other words, the driving force Fr on the rear wheels 10r is represented as Fr=(1−α)·Fd before the driving force Ff on the front wheels 10f saturates. Moreover, the driving force Fr on the rear wheels 10r is represented as the following equation when the driving force Ff on the front wheels 10f saturates.

$$Fr = F\max \cdot (1-\alpha)/\alpha$$

Moreover, after the driving force Ff on the front wheels 10f saturates, an entire increase in the driver-requested driving force Freq is added to the driving force Fr on the rear wheels 10r. Thus, the driving force Fr on the rear wheels 10r is represented as the following equation after the driving force Ff on the front wheels 10f saturates.

$$Fr = F\max \cdot (1-\alpha)/\alpha + (Fd - F\max/\alpha)$$
$$= Fd - F\max$$

Thus, after the driving force Ff on the front wheels 10f saturates, the following relational equation can be acquired by using the driving force distribution coefficient α.

$$\alpha:(1-\alpha) = Ff:Fr = F\max:(Fd - F\max)$$

This equation is solved in terms of the driving force distribution coefficient α as the following equation.

$$\alpha = F\max/Fd$$

Figure 8:
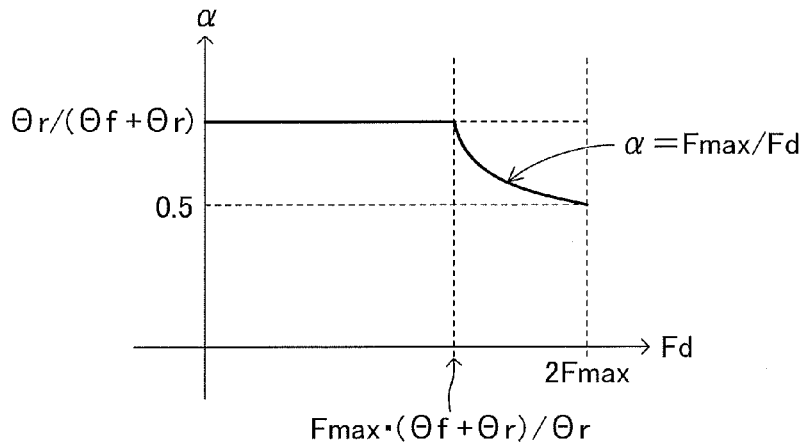
FIG. 8 is a graph showing a characteristic of a driving force distribution coefficient for a zero-cross-margin-oriented distribution.

FIG. 8 shows the driving force distribution coefficient α set depending on Fd as described above. The driving force distribution coefficient α is set to a constant value of (tan θr)/(tan θf+tan θr) when Fd is less than Fmax·(tan θf+tan θr)/(tan θr), and set to Fmax/Fd when Fd is equal to or more than Fmax·(tan θf+tan Θr)/(tan θr).

On this occasion, when the value of Fd/(2Fmax) is set as maximum driving force ratio A, after the driving force Ff on the front wheels 10f saturates, the driving force distribution ratio α can also be represented as follows by using the maximum driving force ratio A (0≤A≤1).

$$\alpha = 1/(2A)$$

A state where the maximum driving force ratio A is 0 (A=0) means that the driver-requested torque Freq is 0 (Freq=0), and a state where the maximum driving force ratio A is 1 (A=1) means that the driver-requested torque Freq takes the maximum value.

Figure 9:
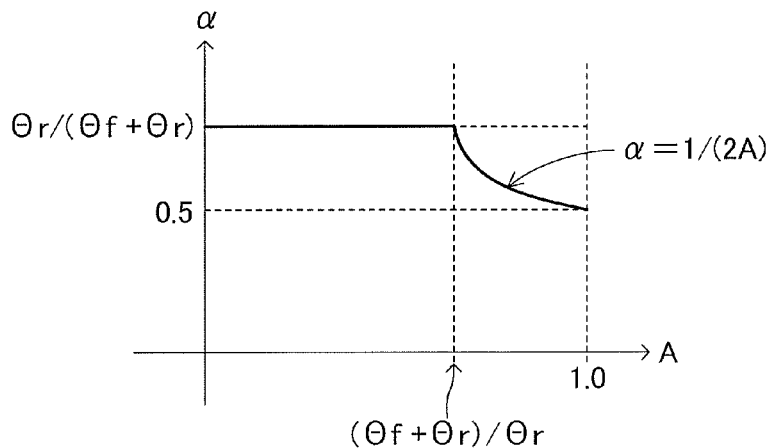
FIG. 9 is a graph showing a characteristic of the driving force distribution coefficient for the zero-cross-margin-oriented distribution.

FIG. 9 is a graph showing the driving force distribution coefficient α while the maximum driving force ratio A is assigned to the horizontal axis.

The motor ECU 50 sets the driving force distribution coefficient α based on the driver-requested driving force Freq (=Fd) in this way. Alternatively, when the accelerator opening degree is considered as the maximum driving force ratio A, the accelerator opening degree may be used to set the driving force distribution coefficient α.

After the motor ECU 50 sets the driving force distribution coefficient α in Step S13, the motor ECU 50 advances the processing to Step S14. In Step S14, the motor ECU 50 calculates the control braking/driving force Fcx for each wheel 10, namely, the control braking/driving force Fcfl for the front left wheel 10fl, the control braking/driving force Fcfr for the front right wheel 10fr, the control braking/driving force Fcrl for the rear left wheel 10rl, and the control braking/driving force Fcrr for the rear right wheel 10rr. The vehicle motion control is carried out in such a case that the difference between the ideal yaw rate and the actual yaw rate detected by the yaw rate sensor exceeds a permissible value, or such a case that at least one of the roll state amount, the pitch state amount, and the heave state amount exceeds a permissible value. Thus, when the vehicle motion control does not need to be carried out, the control braking/driving force Fcx is set to zero.

For example, the control braking/driving force Fcx for each wheel 10 is calculated by using a target roll moment Mx for suppressing a roll motion of the vehicle body about a fore-and-aft axis (roll axis) passing through a center of gravity Cg of the vehicle, a target pitch moment My for suppressing a pitch motion of the vehicle body about a lateral axis (pitch axis) passing through the center of gravity Cg of the vehicle, a target yaw moment Mz for turning the vehicle body about a vertical axis (yaw axis) passing through the center of gravity Cg of the vehicle, and a target heave force Fz for suppressing a heave motion (bouncing) which is a vertical motion at the position of the center of gravity Cg of the vehicle. Various publicly known calculation methods may be employed to calculate those target values. For example, the motor ECU 50 uses the sensor values detected by the stroke sensors and the sprung mass vertical acceleration sensors to detect the positions, the speeds, and the accelerations in the vertical direction at the four wheels, thereby detecting the roll state amount, the pitch state amount, and the heave state amount, and calculates the target roll moment Mx, the target pitch moment My, and the target heave force Fz which have predetermined relationships with those detected state amounts in order to cancel those motions. Moreover, the motor ECU 50 calculates, based on the difference between the ideal yaw rate set based on the steering angle and the vehicle speed and the actual yaw rate detected by the yaw rate sensor, the target yaw moment Mz set so as to eliminate the difference.

The motor ECU 50 calculates the control braking/driving forces Fcfl, Fcfr, Fcrl, and Fcrr, for example, by using the following equation.

$$\begin{bmatrix} Fc_{fl} \\ Fc_{fr} \\ Fc_{rl} \\ Fc_{rr} \end{bmatrix} = \begin{bmatrix} -\frac{t_f}{2} \cdot \tan\theta_f & \frac{t_f}{2} \cdot \tan\theta_f & \frac{t_r}{2} \cdot \tan\theta_r & -\frac{t_r}{2} \cdot \tan\theta_r \\ L_f \cdot \tan\theta_f & L_f \cdot \tan\theta_f & L_r \cdot \tan\theta_r & L_r \cdot \tan\theta_r \\ -\frac{t_f}{2} & \frac{t_f}{2} & -\frac{t_r}{2} & \frac{t_r}{2} \\ -\tan\theta_f & -\tan\theta_f & \tan\theta_r & \tan\theta_r \end{bmatrix}^{-1} \cdot \begin{bmatrix} M_x \\ M_y \\ M_z \\ F_z \end{bmatrix} \quad (1)$$

On this occasion, symbol tf represents a tread width between the front left and right wheels 10f, and symbol tr represents a tread width between the rear left and right wheels 10r. Symbol Lf represents a fore-and-aft horizontal distance between the center of gravity Cg of the vehicle and a center of the front left or right wheel 10f, and symbol Lr represents a fore-and-aft horizontal distance between the center of gravity Cg of the vehicle and a center of the rear left or right wheel 10r.

In this case, the motor ECU 50 selects three out of the target roll moment Mx, the target pitch moment My, the target yaw moment Mz, and the target heave force Fz to calculate the control braking/driving forces Fcfl, Fcfr, Fcrl, and Fcrr. This is because the braking/driving forces to be finally generated on the respective wheels 10 are determined by the driver-requested driving force Freq, in other words, such a restraint that a sum of the control braking/driving forces Fcfl, Fcfr, Fcrl, and Fcrr is set to zero exists, and hence the four target values cannot be used at the same time for the calculation. In this case, if the yaw motion control is necessary, the motor ECU 50 preferentially selects the target yaw moment Mz and the target roll moment Mx, and uses those two target values Mz and Mx and any one of the remaining target pitch moment My and target heave force Fz for the calculation.

Then, in Step S15, the motor ECU 50 calculates a final target braking/driving force Fx for each wheel 10, namely, a target braking/driving force Ffl for the front left wheel 10fl, a target braking/driving force Ffr for the front right wheel 10fr, a target braking/driving force Frl for the rear left wheel 10rl, and a target braking/driving force Frr for the rear right wheel 10rr by the following equations. A common driving force distribution coefficient ($\alpha$,(1−$\alpha$)) is used for the left and right wheels.

$$Ffl=(Freq/2)\cdot\alpha+Fcfl$$

$$Ffr=(Freq/2)\cdot\alpha+Fcfr$$

$$Frl=(Freq/2)\cdot(1-\alpha)+Fcrl$$

$$Frr=(Freq/2)\cdot(1-\alpha)+Fcrr$$

As described above, $\alpha$ is set as follows.

Before the driving force Ff on the front wheels 10f saturates:

$$\alpha=(\tan\theta r)/(\tan\theta f+\tan\theta r)$$

After the driving force Ff on the front wheels 10f saturates:

$$\alpha=Fmax/Fd$$

Then, in Step S16, the motor ECU 50 converts the target braking/driving force Fx into a target motor torque Tx for driving the motor 30, and outputs a braking/driving command signal corresponding to the target motor torque Tx to the motor driver 35. When the target motor torque Tx represents a driving torque, a current flows from the motor driver 35 to the motor 30. When the target motor torque Tx represents a braking torque, a current flows from the motor 30 via the motor driver 35 to the battery 60. The power running control or the regeneration control is applied to the motors 30 in this way, resulting in generation of the target braking/driving force Fx on each wheel 10.

The motor ECU 50 outputs the braking/driving command signal to the motor driver 35, and then once finishes the motor control routine. Then, the motor ECU 50 repeats the motor control routine at the predetermined short cycle.

Figure 4:
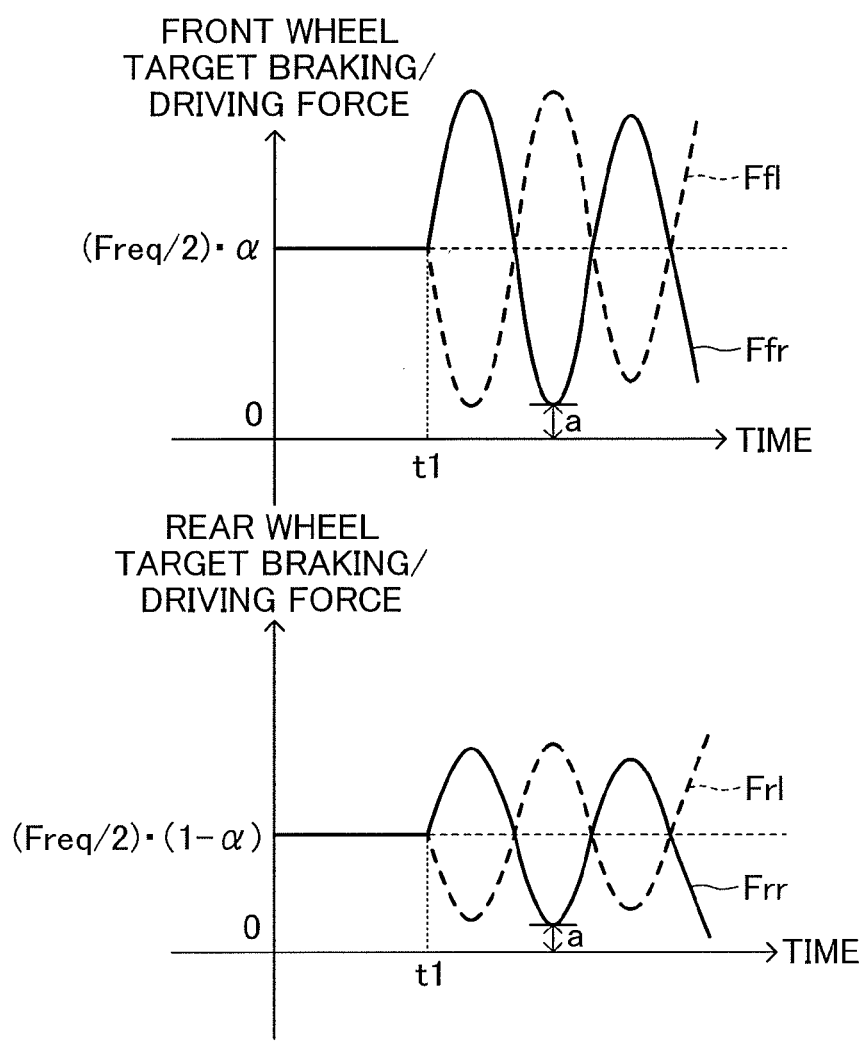
FIG. 4 is a graph showing target braking/driving forces during roll control according to the first embodiment of the present invention.

The vehicle braking/driving force control apparatus according to this embodiment described above sets the ratio of distribution of the driver-requested driving force Freq to the front/rear wheels 10f and 10r so that the margin to the zero cross of the motor torque is equal for the front and rear wheels 10f and 10r. With this, the distribution of the driver-requested driving force Freq to the front wheels 10f, which are the wheels on the side smaller in vertical force conversion rate, increases. As a result, while the driver-requested driving force Freq is satisfied, the frequency of the zero cross of the motor torque can be restrained for the four wheels as a whole. For example, when the yaw motion of the vehicle is generated, and the control braking/driving forces Fcfl and Fcfr on the front wheels 10f are larger than the control braking/driving forces Fcrl and Fcrr on the rear wheels 10r in order to balance (equalize) the front-wheel-side roll moment and the rear-wheel-side roll moment with each other, as shown in FIG. 4, the zero cross margins a for the front/rear wheels 10f and 10r are approximately equal to one another, and the motor torque is thus prevented from presenting the zero cross on all the four wheels. Thus, a generation frequency and a generation level of the noise and a vibration caused by the backlash can be restrained. Moreover, when the driving force distribution coefficient $\alpha$ is set, as shown in FIG. 8, after the driving forces on the front wheels 10f reach the driving limit, the driving force distribution coefficient $\alpha$ is reduced as the driver-requested driving force Freq increases so as to distribute all the increase in the driver-requested driving force Freq to the driving forces on the rear wheels 10r, and the distribution of the driver-requested driving force Freq can thus be appropriately distributed to the front/rear wheels 10f and 10r while the frequency of the zero cross of the motor torque on the front wheel 10f is restrained.

<Second Embodiment>

A description is now given of a second embodiment of the present invention. The embodiment described above is hereinafter referred to as first embodiment. In the first embodiment, the ratio of distribution of the driver-requested driving force Freq to the front/rear wheels 10f and 10r is set so that the margin to the zero cross of the motor torque is equal for the front and rear wheels 10f and 10r. In this case, the noise and the vibration caused by the backlash can be restrained from being generated, but the target braking/driving forces Ffl and Ffr on the front wheels 10f, which are the wheels on the side smaller in vertical force conversion rate, first reach the driving limit of the motors 30. In other words, reserve forces for generating the vertical forces on the front wheels 10f are lost earlier than on the rear wheels 10r. For example, as described above, when the roll control is carried out in order to balance the front-wheel-side roll moment and the rear-wheel-side roll moment with each other, the maximum value of the control braking/driving forces Fcfl and Fcfr on the front wheels 10f is larger than the maximum value of the control braking/driving forces Fcrl and Fcrr on the rear wheels. Therefore, the target braking/driving force Ffl or Ffr on the front wheel 10f turning (turning outer wheel) may first exceed the control range of the motor 30 depending on the travel state of the vehicle. In this case, the control range of the vehicle motion control decreases.

Thus, in the second embodiment, while such a distribution (hereinafter referred to as zero-cross-margin-oriented distribution) of the driver-requested driving force that the margins to the zero cross of the motor torque are equal on the front/rear wheels 10f and 10r is carried out as in the first embodiment, such a distribution (hereinafter referred to as vertical-force-generation-reserve-force-oriented distribution) of the driver-requested driving force that the reserve forces for generating the vertical forces are equal for the front/rear wheels 10f and 10r is carried out in place of the zero-cross-margin-oriented distribution depending on the travel state of the vehicle.

First, a description is given of the vertical-force-generation-reserve-force-oriented distribution. In the vertical-force-generation-reserve-force-oriented distribution, the driver-requested driving force Freq is distributed to the front/rear wheels 10f and 10r so that the reserve forces of the vertical forces which can be generated by the driving force Ff on the front wheels 10f and the reserve forces of the vertical forces which can be generated by the driving force Fr on the rear wheels 10r are equal to each other. In this description, "1. Vertical force", "2. Driving forces on front and rear wheels after distribution", and "3. Vertical forces after distribution" described in the first embodiment are common, and hence these common parts are omitted, and a description is given of subsequent different parts.

4. Maximum Vertical Force

When the maximum driving force that can be generated by each of the front wheel 10f and the rear wheel 10r is represented by Fmax, the maximum vertical force Fzfmax that can be generated by the driving force Ff on the front wheel 10f and the maximum vertical force Fzrmax that can be generated by the driving force Fr on the rear wheel 10r can be represented by the following equations.

$$Fzfmax=Fmax\cdot\Theta f$$

$$Fzrmax=Fmax\cdot\Theta r$$

5. Reserve Vertical Force

When the reserve vertical force which can be generated by the driving force Ff on the front wheel 10$f$ is represented by Fzfc (referred to as front wheel reserve vertical force Fzfc), and the reserve vertical force which can be generated by the driving force Ff on the rear wheel 10$r$ is represented by Fzrc (referred to as rear wheel reserve vertical force Fzrc), the front wheel reserve vertical force Fzfc and the rear wheel reserve vertical force Fzrc can be represented by the following equations.

$Fzfc=Fzf\max-Fzf=F\max-F\max\cdot\Theta-\alpha\cdot Fd\cdot\Theta f$ $=(F\max-\alpha\cdot Fd)\cdot\Theta f$ $Fzrc=Fzr\max-Fzr=F\max\cdot\Theta r-(1-\alpha)\cdot Fd\cdot\Theta r$ $=(F\max-(1-\alpha)\cdot Fd)\cdot\Theta r$ 6. Driving Force Distribution Ratio α when Reserve Vertical Forces are Equalized Between the Front and Rear Wheels When the front wheel reserve vertical force Fzfc and the rear wheel reserve vertical force Fzrc are equalized, only a particular wheel is prevented from reaching the driving limit earlier. In this case, the driving force distribution coefficient α can be set as follows.

Fzfc=Fzrc $(F\max-\alpha\cdot Fd)\cdot\Theta f=(F\max-(1-\alpha)\cdot Fd)\cdot\Theta r$ $(1-\alpha\cdot Fd/F\max)=(1-(1-\alpha)\cdot Fd/F\max)\cdot\Theta r/\Theta f$ On this occasion, Fd/(2Fmax)=A (maximum driving force ratio A) and $\Theta r/\Theta f$=D (front/rear vertical force conversion ratio) are used to represent the above-mentioned equation as follows.

$(1-2\alpha\cdot A)=(1-2(1-\alpha)\cdot A)\cdot D$

When the equation is solved in terms of the driving force distribution coefficient α, the equation can be represented as follows.

$1-2\alpha\cdot A=D-2A\cdot D+2\alpha\cdot A\cdot D$ $2\alpha\cdot A(1+D)=1-D+2A\cdot D$ $\alpha=(1-D+2A\cdot D)/2A(1+D))$ 7. Consideration of Driving Force Distribution Coefficient α

Case of A=0

The driving force distribution coefficient α can be represented by the following equation.

$\alpha=((1-D)/A+2D)/2(1+D))$

The front/rear vertical force conversion ratio D is a value larger than 1, and (1−D) is thus a negative value. Therefore, the driving force distribution coefficient α is a negative infinite value ($\alpha=-\infty$).

A possible range which the driving force distribution coefficient α can take is 0 to 1 ($0\leq\alpha\leq1$), and hence the driving force distribution coefficient α needs to be zero (α=0).

Case of A=1

When a value A=1 is substituted into the above-mentioned equation, the driving force distribution coefficient α is 0.5 (α=0.5).

On this occasion, the maximum driving force ratio A satisfying α=0 is acquired.

$0=1-D+2A\cdot D$ $A=(D-1)/(2D)$

Figure 10:
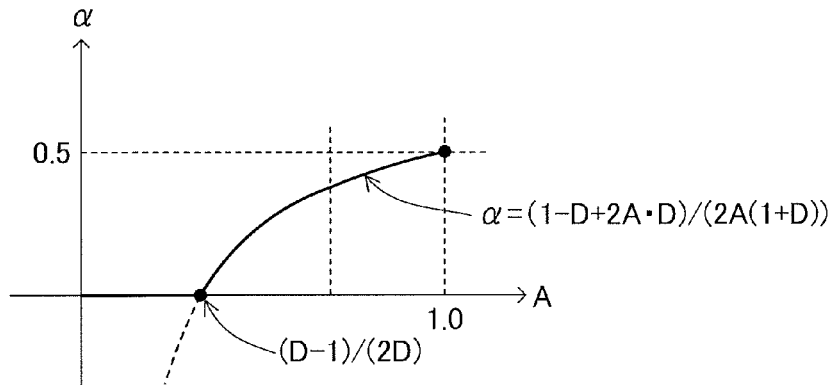
FIG. 10 is a graph showing a characteristic of the driving force distribution coefficient for a vertical-force-generation-reserve-force-oriented distribution according to a second embodiment of the present invention.

Thus, as shown in FIG. 10, the driving force distribution coefficient α is set to zero when the maximum driving force ratio A is less than (D−1)/(2D), and is set to (1−D+2A·D)/(2A(1+D)) when the maximum driving force ratio A is equal to or more than (D−1)/(2D).

When the driving force distribution coefficient α is set in this way, only a particular wheel 10 can be prevented from reaching the driving limit earlier.

Figure 11:
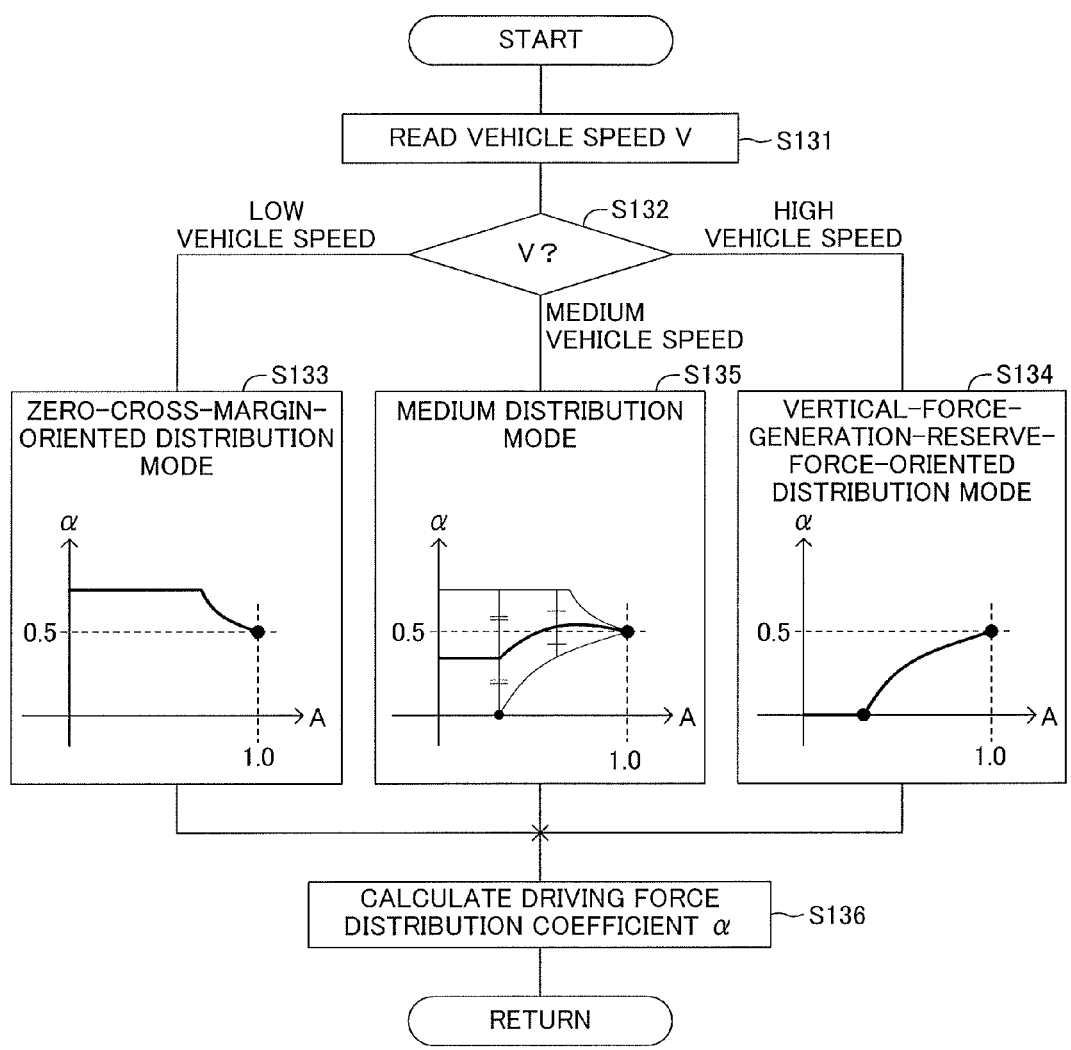
FIG. 11 is a flow chart illustrating a driving force distribution coefficient setting routine according to the second embodiment of the present invention.

In the vehicle braking/driving force control apparatus according to the second embodiment, the motor ECU 50 switches the calculation form of the driving force distribution coefficient α as follows depending on the vehicle speed. FIG. 11 illustrates a driving force distribution coefficient setting routine executed by the motor ECU. This driving force distribution coefficient setting routine is executed in place of the processing of Step S13 according to the first embodiment. Thus, the second embodiment is different from the first embodiment in only such a point that this driving force distribution coefficient setting routine is executed, and is the same as the first embodiment in the other configurations.

After the completion of the calculation of the driver-requested driving force Freq in Step S12 of FIG. 3, the motor ECU 50 starts the driving force distribution coefficient setting routine illustrated in FIG. 11. When the driving force distribution coefficient setting routine starts, in Step S131, the motor ECU 50 first reads the vehicle speed V detected by the vehicle speed sensor. Then, in Step S132, the motor ECU 50 determines a vehicle speed area (low vehicle speed, medium vehicle speed, and high vehicle speed) including the read current vehicle speed V. Out of those vehicle speed areas, a range of 0≤V<V1 is set as the low vehicle speed, a range of V1≤V<V2 is set as the medium vehicle speed, and a range of V2≤V is set as the high vehicle speed, and those ranges are set in advance.

When the vehicle speed V is the low vehicle speed, in Step S133, the motor ECU 50 sets a driving force distribution coefficient setting mode to the zero-cross-margin-oriented distribution mode. In the zero-cross-margin-oriented distribution mode, the calculation methods for the driving force distribution coefficient α illustrated in FIGS. 8 and 9 are selected as in the first embodiment. Moreover, when the vehicle speed V is the high vehicle speed, in Step S134, the motor ECU 50 sets the driving force distribution coefficient setting mode to the vertical-force-generation-reserve-force-oriented distribution mode. In the vertical-force-generation-reserve-force-oriented distribution mode, the calculation method for the driving force distribution coefficient α described in "6." and "7." and illustrated in FIG. 10 is selected. Moreover, when the vehicle speed V is the medium vehicle speed, in Step S135, the motor ECU 50 sets the driving force distribution coefficient setting mode to a medium distribution mode. In the medium distribution mode, a calculation method for the driving force distribution coefficient α, which is a medium mode between the zero-cross-margin-oriented distribution mode and the vertical-force-generation-reserve-force-oriented distribution mode, is selected. In this example, the calculation method is set to a calculation method of using an average, (α1+α2)/2, of the driving force distribution coefficient (referred to as α1) calculated by using the zero-cross-margin-oriented distribution mode and the driving force distribution coefficient (referred to as α2) calculated by using the vertical-force-generation-reserve-force-oriented distribution mode.

After setting the driving force distribution coefficient setting mode in any one of Steps S133, S134, and S135, in the following Step S136, the motor ECU calculates the driving force distribution coefficient α by using the calculation method specified by the set mode. When the motor ECU completes the calculation of the driving force distribution coefficient α in Step S136, the motor ECU finishes this routine, and starts the processing of Step S14 of FIG. 3.

In the second embodiment, the zero-cross-margin-oriented distribution mode is selected in the case of the low vehicle speed, and the vertical-force-generation-reserve-force-oriented distribution mode is selected in the case of the high vehicle speed. A description is now given of a reason for this selection. Background noises (such as an engine noise, a wind noise, and a tire noise) are low at the low vehicle speed, and hence the driver tends to hear the noise caused by the backlash of the speed reduction gears 31. Moreover, a road surface input is often a large input at a low frequency, and an amplitude of the control braking/driving force Fcx for the road surface input thus increases, and the zero cross of the motor torque tends to occur. Moreover, the motor torque itself is small, and the margin to the zero cross is thus small.

On the other hand, the background noise is high during a travel at the high vehicle speed, and hence the noise caused by the backlash of the speed reduction gears 31 is hard for the driver to hear. Moreover, the road surface input is often a small input at a high frequency, and the amplitude of the control braking/driving force Fcx for the road surface input thus decreases. Moreover, a torque matching a large travel resistance is acting as the driver-requested driving force, and thus the motor torque itself is large, and the margin to the zero cross is large, but such a case that the reserve force in the driving direction is small is assumed.

Thus, in the second embodiment, the zero-cross-margin-oriented distribution mode is selected at the low vehicle speed to efficiently reduce the generation of the noise caused by the backlash. Moreover, the vertical-force-generation-reserve-force-oriented distribution mode is selected at the high vehicle speed, thereby preventing such a defect that the reserve force for generating the vertical force on the front wheels 10f is lost earlier than on the rear wheels 10r from occurring, resulting in a wider control rage of the vehicle motion control. For example, even when the roll control is carried out simultaneously with the yaw motion control at the high speed travel, the target braking/driving force Fx on the front wheel 10fl is less likely to reach the output limit, resulting in appropriate roll control. Moreover, the driving force distribution coefficient α is calculated by the medium mode between the zero-cross-margin-oriented distribution mode and the vertical-force-generation-reserve-force-oriented distribution mode at the medium vehicle speed, and actions/effects of both of the modes can thus be acquired in a well-balanced manner.

The vehicle braking/driving force control apparatus according to this embodiment is described above, but the present invention is not limited to the above-mentioned embodiments. Various modifications may be made thereto without departing from the gist of the present invention.

For example, in the zero-cross-margin-oriented distribution mode according to the first embodiment and the second embodiment, such a configuration that the driving force distribution coefficient α for the driver-requested driving force Freq is set so that the margins to the zero cross of the motor torque are equal on the front/rear wheels is employed, but the equalization is not always necessary. For example, such a configuration that a ratio of distribution to the wheel (front wheel) on the side smaller in vertical force conversion rate of the driver-requested driving force Freq is set to a constant ratio larger than that to the wheel (rear wheel) on the side larger in vertical force conversion rate may be employed.

Moreover, this embodiment is applied to such a vehicle that the vertical force conversion rate (tan(θr)) on the rear suspensions 20r is more than the vertical force conversion rate (tan(θf)) on the front suspension 20f, but this embodiment may be applied to such a vehicle that the vertical force conversion rate (tan(θf)) of the front suspension 20f is more than the vertical force conversion rate (tan(θr)) of the rear suspensions 20r. In this case, the distributions of the driver-requested driving force Freq to the front/rear wheels only needs to be opposite to those of this embodiment. Specifically, the distributions are set so that the rear wheels 10r is more in the distribution than the front wheels 10f.

Moreover, in the second embodiment, such a configuration that the vehicle speed is divided into the three stages and one mode corresponding to the vehicle speed is selected from the three driving force distribution coefficient setting modes (the zero-cross-margin-oriented distribution mode, the medium distribution mode, and the vertical-force-generation-reserve-force-oriented distribution mode) is provided, but such a configuration that the vehicle speed is divided into two stages (a low vehicle speed and a high vehicle speed), and the medium distribution mode is omitted may be provided. In other words, such a configuration that V1 and V2, which are the thresholds for the vehicle speed V, are set to the same value (V1=V2), the processing of Step S133 is carried out when the vehicle speed V satisfies a relationship of 0≤V<V1 and the processing of Step S134 is carried out when the vehicle speed V satisfies a relationship of V1≤V, and the processing of Step S135 is omitted may be provided. Moreover, the driving force distribution coefficient α does not always need to be calculated so that the vertical force generation reserve forces are the same on the front/rear wheels at the high vehicle speed, and, for example, the driving force distribution coefficient α may be set to a constant value less than 0.5 (50%).

Moreover, in the second embodiment, the driving force distribution coefficient α is set in the medium distribution mode by using the average (α1+α2)/2 of the driving force distribution coefficient α1 calculated by using the zero-cross-margin-oriented distribution mode and the driving force distribution coefficient α2 calculated by using the vertical-force-generation-reserve-force-oriented distribution mode, but the setting does not need to be carried out in this way. For example, the driving force distribution coefficient α1 calculated by using the zero-cross-margin-oriented distribution mode may be weighted more and the driving force distribution coefficient α2 calculated by using the vertical-force-generation-reserve-force-oriented distribution mode may be weighted less as the vehicle speed V decreases. Further, the driving force distribution coefficient α1 calculated by using the zero-cross-margin-oriented distribution mode may be weighted less and the driving force distribution coefficient α2 calculated by using the vertical-force-generation-reserve-force-oriented distribution mode may be weighted more as the vehicle speed V increases. In other words, the distribution setting means may be configured to set ratio of distribution to the wheels 10 coupled to the suspensions 20 on the side smaller in conversion rate to a larger value as the vehicle speed V decreases. Moreover, a fixed driving force distribution coefficient α such as 0.5 (50%) may be set in the medium distribution mode.

What is claimed is:

1. A vehicle braking/driving force control apparatus, comprising:

a motor provided on each of a front left wheel, a front right wheel, a rear left wheel, and a rear right wheel, which is capable of transmitting a torque via gears to each of the wheels, thereby generating a braking/driving force on the each of the wheels;

a suspension for coupling the each of the front left wheel, the front right wheel, the rear left wheel, and the rear right wheel to a body, and converting the braking/driving force on the each of the wheels to a force in a vertical direction of the body;

target braking/driving force calculation means for calculating a target braking/driving force for the each of the wheels, the target braking/driving force including: a driver-requested distributed driving force acquired by distributing a driver-requested driving force set based on an operation amount by a driver to the each of wheels; and a control braking/driving force for the each of the wheels required for vehicle motion control; and motor control means for controlling an operation of the motor by following the target braking/driving force, the suspension being configured so that a conversion rate of converting the braking/driving force on the each of the wheels into the force in the vertical direction of the body is different between a front wheel side and a rear wheel side, wherein the motor control means includes the conversion rate pre-stored therein, the target braking/driving force calculation means comprising distribution setting means for setting a distribution of the driver-requested driving force to the front wheels and the rear wheels so that a larger driver-requested driving force is distributed to the wheels coupled to the suspensions on a side smaller in the conversion rate than to the wheels coupled to the suspension on a side larger in the conversion rate.

2. A vehicle braking/driving force control apparatus according to claim 1, wherein the distribution setting means sets, regarding the distribution of the driver-requested driving force to the front wheels and the rear wheels, a ratio of distribution to the wheels coupled to the suspensions on the side smaller in the conversion rate to a constant set distribution ratio more than 0.5 when the driver-requested driving force is less than a set driving force, and changes the ratio of distribution so that the ratio of distribution decreases within a range of the set distribution ratio or less as the driver-requested driving force increases when the driver-requested driving force is equal to or more than the set driving force.

3. A vehicle braking/driving force control apparatus according to claim 2, wherein the distribution setting means uses, as the set distribution ratio, a value calculated when a sum of the conversion rate of the suspensions for the front wheels and the conversion rate of the suspensions for the rear wheels is set as a denominator and the conversion rate of the suspensions on the side larger in the conversion rate is set as a numerator.

4. A vehicle braking/driving force control device according to claim 1 further comprising vehicle speed acquisition means for acquiring a vehicle speed, wherein the distribution setting means sets, regarding the distribution of the driver-requested driving force to the front wheels and the rear wheels, a ratio of distribution to the wheels coupled to the suspensions on the side smaller in the conversion rate to a value larger than 0.5 when the vehicle speed is less than a first set vehicle speed and sets the ratio of distribution to a value equal to or less than 0.5 when the vehicle speed is equal to or more than a second set vehicle speed, which is equal to or more than the first set vehicle speed.

\* \* \* \* \*